(12) United States Patent
Fujisawa et al.

(10) Patent No.: US 12,211,059 B2
(45) Date of Patent: Jan. 28, 2025

(54) POWER MANAGEMENT SYSTEM

(71) Applicant: TOYOTA JIDOSHA KABUSHIKI KAISHA, Toyota (JP)

(72) Inventors: Hisashi Fujisawa, Toyota (JP); Shigeki Kinomura, Toyota (JP); Atsushi Oki, Nagoya (JP); Hiroki Takabatake, Chiryu (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/333,370

(22) Filed: Jun. 12, 2023

(65) Prior Publication Data

US 2024/0054516 A1 Feb. 15, 2024

(30) Foreign Application Priority Data

Aug. 10, 2022 (JP) .................................. 2022-127678

(51) Int. Cl.
*G06Q 30/0207* (2023.01)
*G06Q 30/0283* (2023.01)
*G06Q 30/0601* (2023.01)
*G06Q 50/06* (2024.01)

(52) U.S. Cl.
CPC ..... *G06Q 30/0207* (2013.01); *G06Q 30/0284* (2013.01); *G06Q 30/0605* (2013.01); *G06Q 50/06* (2013.01)

(58) Field of Classification Search
CPC . G06Q 30/0207; G06Q 30/0284; G06Q 50/06
See application file for complete search history.

(56) References Cited

U.S. PATENT DOCUMENTS

| 2018/0111494 | A1* | 4/2018 | Penilla | G06Q 20/145 |
| 2018/0218459 | A1* | 8/2018 | Yokoyama | H04L 67/12 |
| 2019/0366868 | A1* | 12/2019 | Tseng | E04H 6/22 |
| 2023/0065737 | A1* | 3/2023 | Saito | G06Q 10/02 |

FOREIGN PATENT DOCUMENTS

| CN | 111223244 A | * | 6/2020 |
| JP | 2016-218648 A | | 12/2016 |

* cited by examiner

*Primary Examiner* — Mario C. Iosif
(74) *Attorney, Agent, or Firm* — Finnegan, Henderson, Farabow, Garrett, and Dunner, LLP (57) ABSTRACT

A store terminal executes a process including a step S500 for determining whether or not to receive the allocation fee and a step S502 for determining whether or not there is a request for termination of use, and further including, when the allocation fee is received (YES in S500) and it is determined that there is a request for termination of use (YES in S502), a step S504 for acquiring a usage time, a step S506 for setting a discount amount, a step S508 for setting a usage fee, and a step S510 for executing a checkout process.

2 Claims, 7 Drawing Sheets

POWER MANAGEMENT SYSTEM

CROSS-REFERENCE TO RELATED APPLICATION

This application claims priority to Japanese Patent Application No. 2022-127678 filed on Aug. 10, 2022 incorporated herein by reference in its entirety.

BACKGROUND

1. Technical Field

The present disclosure relates to a power management system.

2. Description of Related Art

Conventionally, there has been known a Virtual Power Plant (VPP) that functions like a single power plant by using a server and the like to remotely and integrally controlling a small-scale energy resource such as a power storage device mounted on an electrified vehicle parked in a store, a factory, or a house. In the VPP, for example, electric power demand can be leveled by performing a demand adjustment for changing the demand amount of electric power in the electric power grid by charging and discharging an in-vehicle electric power storage device connected to the electric power grid. For example, when a request (i.e., an increase demand response (DR)) for increasing a demand amount of electric power in the electric power grid is received, the demand amount of the electric power can be increased by charging the in-vehicle electric power storage device connected to the electric power grid. A vehicle participating in such a supply and demand adjustment can receive an incentive corresponding to the contribution of the supply and demand adjustment.

For example, Japanese Unexamined Patent Application Publication No. 2016-218648 (JP 2016-218648 A) discloses a technique of calculating a cumulative charge amount of an electrified vehicle to be charged from an identification information of electrified vehicle and a detected charge electric power amount, and setting an incentive to be given to an occupant of the electrified vehicle based on the cumulative charge amount.

SUMMARY

For example, when electrified vehicle parked in the parking space is caused to participate in the supply and demand adjustment by using the charging and discharging station installed in a shop, there is a case in which the shop carries the burden of an incentive that is given to a user of the shop who is the occupant of the vehicle participating in the supply and demand adjustment as described above. However, there is a case in which the contribution amount to the supply and demand adjustment is larger than planned even if the electrified vehicle participates in the supply and demand adjustment in a short period of time, depending on the conditions of the electrified vehicle. For this reason, for example, in a case where a usage fee of the store is calculated in accordance with the usage time, if a large incentive is generated even if the usage time is a relatively short time, there is a case in which the burden on the store side is increased.

The present disclosure has been made in order to solve the above-described problems, and an object thereof is to provide a power management system that appropriately sets an incentive for a participant of supply and demand adjustment.

A power management system according to an aspect of the present disclosure includes:

a charging and discharging station that is installed in a parking space of a facility and that is connected to a power grid; and a server that manages a usage time of the facility by a user using a vehicle equipped with a power storage device and that performs adjustment of supply and demand of power in the power grid.

When the supply and demand adjustment using the power storage device is performed, the server adjusts a usage fee of the facility set on accordance with the usage time by using an incentive corresponding to a contribution amount to the supply and demand adjustment.

In this way, by adjusting the usage fee set in accordance with the usage time using the incentive, the usage fee can be set so as not to increase the burden on the facility side. Therefore, it is possible to appropriately set the incentive for the participants in the supply and demand adjustment.

In one embodiment, when the usage time is shorter than a threshold value, the server sets a correction factor that corrects a discount amount of the usage fee corresponding to the incentive to be low.

In this way, when the usage time is short, the discount amount corresponding to the incentive can be lowered and thus, the usage fee can be set so as not to increase the burden on the facility side.

Further, in one embodiment, when the usage time is longer than a threshold value, the server sets a usage fee per unit time to a lower amount than when the usage time is shorter than the threshold value.

In this way, when the usage time is longer than the threshold value, the server sets the usage fee per unit time to a lower amount than when the usage time is shorter than the threshold value. Thus, it is possible to promote using the facility for a long time.

According to the present disclosure, it is possible to provide a power management system that can appropriately set the incentive for the participants in the supply and demand adjustment.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. In the drawings, the same or corresponding portions are denoted by the same reference signs and the description thereof will not be repeated.

Figure 1:
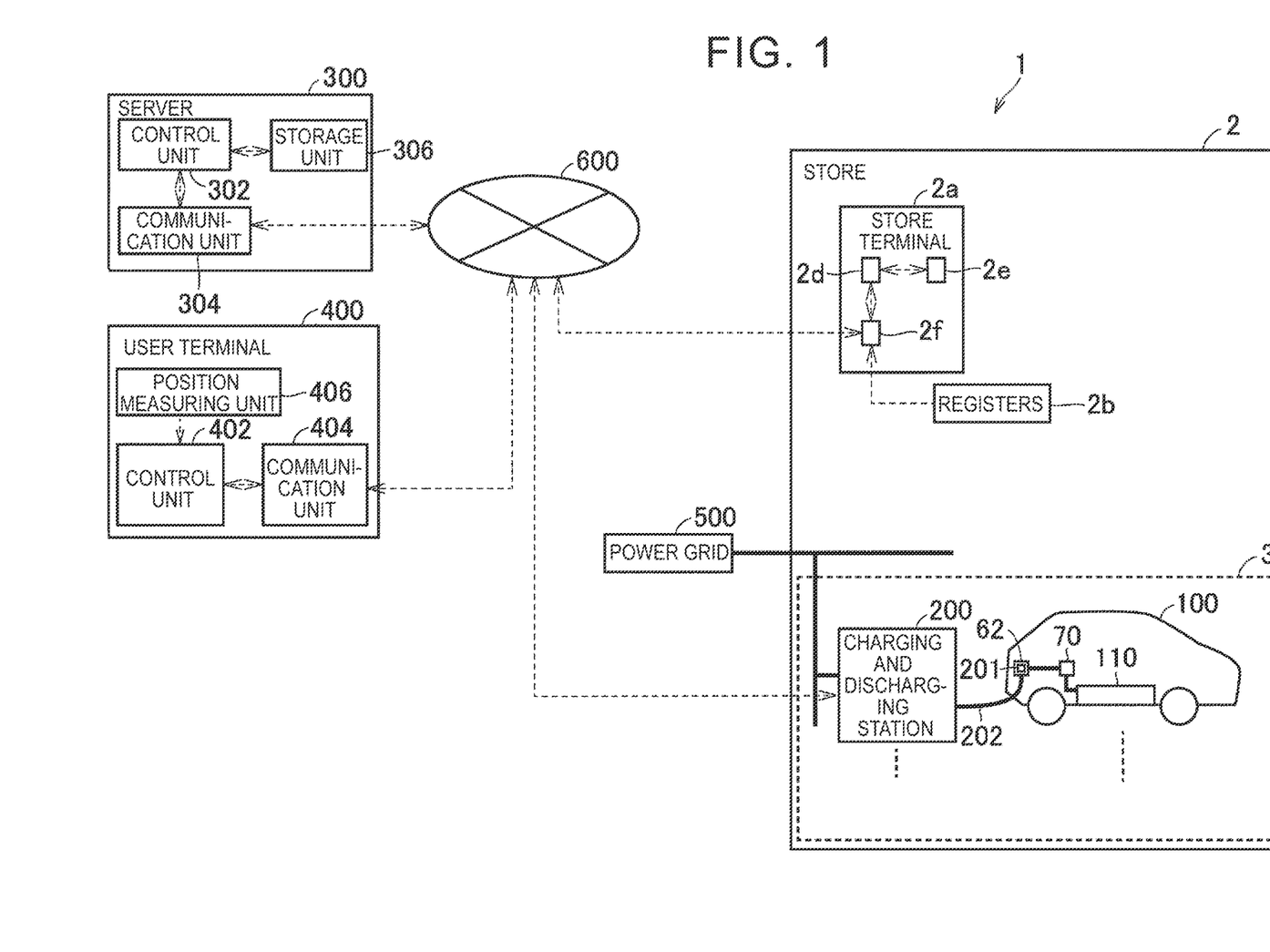
FIG. 1 is a diagram illustrating an example of a configuration of a power management system according to the present embodiment.

FIG. 1 is a diagram illustrating an example of a configuration of a power management system 1 according to the present embodiment. As illustrated in FIG. 1, the power management system 1 according to the present embodiment includes a store terminal 2a, a charging and discharging station 200, an electrified vehicle 100, servers 300, user terminals 400, and a communication network 600. The charging and discharging station 200 is provided at a plurality of locations in the parking lot 3 of the store 2. In FIG. 1, typically one charging and discharging station 200 is shown.

The store 2 is a facility that provides various products and various services to a user, and is, for example, a facility in which a usage fee is set at least according to a usage time. Store 2 may include, for example, a cafe, a net cafe, a cartoon, a bathroom, a lodging facility, or a complex thereof.

In the store 2, a store terminal 2a, a register 2b, a parking lot 3, and a charging and discharging station 200 are installed. Electric power from the electric power grid 500 is supplied to various electric devices installed in the store 2.

The store terminal 2a receives reservation information of a user (a user) who uses the store 2, stores information about a privilege provided to the user, and provides information about a user who is using the store 2 such as reservation information and usage times of the user to the servers 300.

The register 2b executes, for example, a transaction of a commodity between a store clerk of the store 2 and a user of the store 2, a payment process and a settlement process after providing a service, a point granting process, and the like. The register 2b stores payment information generated by the payment process, payment information generated by the payment process, and point information. The register 2b exchanges information with the store terminal 2a. The payment processing and the settlement processing include, for example, payment processing and settlement processing by electronic money using a user terminal or the like. The point granting process includes, for example, a process of adding new point information based on the information about the privilege stored in the store terminal 2a to the point information stored in the user terminal 400 of the user. The payment information and the settlement information include information on a store where a sales transaction or a service is provided, information on a usage history of a sold product or service, information on a user, and the like.

Electrified vehicle 100 is, for example, a battery electric vehicle including an inlet 62, a power conversion device 70, and a battery 110 that stores power for traveling. In FIG. 1, an electrified vehicle 100 is shown parked, for example, in a parking space in a parking lot 3.

The charging and discharging station 200 is connected to a power line that is installed in the store 2 and branched from a power line connected to the electric power grid 500. One end of the cable 202 is connected to the charging and discharging station 200. A connector 201 is connected to the other end of the cable 202. The connector 201 is configured to be connectable to an electrified vehicle 100. In FIG. 1, a connector 201 is shown, for example, connected to an inlet 62 of an electrified vehicle 100.

When the connector 201 is connected to the inlet 62, electric power can be exchanged between the charging and discharging station 200 and electrified vehicle 100.

The server 300 is, for example, a server operated by an operator of a lower aggregator (resource aggregator). The lower aggregator is an operator that directly controls small-scale power supply facilities such as the charging and discharging station 200 upon receiving a request for adjusting the supply and demand of electric power (hereinafter, also referred to as a Demand Response (DR) from a higher layer (for example, a higher-level aggregator (aggregation coordinator) or a power transmission/distribution operator (electric power company)). If the lower aggregator adjusts the supply and demand using the small-scale power supply system in accordance with DR request, the lower aggregator provides the owner of the small-scale power supply system with an incentive corresponding to the contribution.

The servers 300 are configured to be able to communicate with a store terminal 2a, an electrified vehicle 100, a user terminal 400 to be described later, and a communication network 600. The server 300 manages power exchanged between the power storage device in the store 2 and the electric power grid 500.

The transfer of electric power between the electric storage device in the store 2 and the electric power grid 500 includes at least one of stopping the supply of the electric power supply or from the electric storage device to the electric power grid 500 and stopping the supply of the electric power supply or from the electric power grid 500 to the electric storage device.

The server 300 is configured to be able to instruct the charging and discharging station 200 to execute at least one of charging of the battery 110 mounted on electrified vehicle 100 connected to the charging and discharging station 200, power supply from the battery 110, charge stop of the battery 110, and power supply stop from the battery 110.

The user terminals 400 are each carried by a user, and include, for example, mobile terminals of at least one of a mobile phone, a smartphone, and a smartwatch.

The user terminal 400 is configured to be able to communicate with the store terminal 2a through a base station for radio communication installed in the store 2 or outside the store 2 and a communication network 600 including the Internet or the like. The user terminal 400 is configured to be capable of communicating with a base station for wireless communication in a predetermined communication format. The predetermined communication format includes, for example, wireless communication according to a wireless communication scheme using a wireless communication standard such as a wireless Local Area Network (LAN or a 3G, 4G, 5G of a mobile telephone.

The user terminal 400 is provided with, for example, a position measurement unit 406. The user terminal 400 can acquire the position information of the terminal using the output result of the position measurement unit 406. The position measurement unit 406 may be a unit using Global Positioning System (GPS) or the like, or may be a unit using a radio communication device such as a Wifi.

The power grid 500 includes, for example, a power plant including a power generation device for generating electricity, a power system constructed by a transmission and distribution facility including a transmission line, a substation, a distribution line, and the like, and is connected to a power line installed in the store 2 so as to be capable of transmitting and receiving power.

Electrified vehicle 100 includes an inlet 62, a power conversion device 70, and a battery 110.

The battery 110 is a DC power supply configured to be rechargeable, and is, for example, a secondary battery such as a nickel-hydrogen battery or a lithium-ion battery including a solid or liquid electrolyte. The battery 110 is an example of a power storage device that stores electric power, and is not limited to a secondary battery. For example, instead of the battery 110, a capacitor or the like may be used as a DC power source capable of being recharged.

A connector 201 of the charging and discharging station 200 is attached to the inlet 62. The inlet 62 has a structure in which the connector 201 can be attached and detached.

When power can be exchanged between the inlet 62 and the power conversion device 70, the power conversion device 70 operates so that the charging power can be supplied from the inlet 62 to the battery 110 (that is, the state in which the charging control can be executed), or the state in which the power can be supplied from the battery 110 to the inlet 62 (that is, the state in which the power supply control can be executed).

When the electrical connection between the inlet 62 and the power conversion device 70 is interrupted, the charging power from the electric power grid 500 to the battery 110 via the inlet 62 cannot be supplied, or the power supply from the battery 110 to the inlet 62 cannot be supplied.

The charging and discharging station 200 includes a control device and a communication device (neither of which is shown). The controller includes a Central Processing Unit (CPU) and memories (e.g., Read Only Memory (ROM), Random Access Memory (RAM), etc. The control device controls each device of the charging and discharging station 200 based on information such as signals from various sensors provided in the charging and discharging station 200, maps and programs stored in the memory, and the like. The various kinds of control performed by the control device are not limited to the processing by software, and can be processed by dedicated hardware (electronic circuit).

The control device calculates State Of Charge (SOC of the battery 110 based on a current sensor, a voltage sensor, or the like. As a method of calculating SOC, various known methods such as a method by integrating current values (Coulomb count) or a method by estimating open-circuit voltage Open Circuit Voltage (OCV can be adopted. Note that SOC of the battery 110 may be calculated in electrified vehicle 100 and transmitted to the charging and discharging station 200, or may be calculated in the servers 300, for example.

The communication device is configured to be capable of bidirectional communication with the server 300 via the communication network 600, for example.

The servers 300 manage electrified vehicle 100 batteries 110 connected to the charging and discharging stations 200 of the store 2 as one of a plurality of energy resources. For example, the servers 300 perform charging or discharging in a plurality of energy resources including the battery 110 mounted on electrified vehicle 100 connected to the charging and discharging station 200 of the store 2, thereby changing the amount of power demand in the electric power grid 500 and leveling (adjusting supply and demand) the power demand.

The server 300 includes a control unit 302, a communication unit 304, and a storage unit 306. The control unit 302 includes a CPU (not shown) and the like, and is configured to execute a predetermined arithmetic process based on information stored in the storage unit 306, information received from the charging and discharging station 200 via the communication unit 304, information received from the store terminal 2a via the communication unit 304, and the like.

The communication unit 304 is configured to be able to communicate with each of the charging and discharging station 200 and the store terminal 2a through the communication network 600. The communication unit 304 and the device of the communication destination exchange information with each other by a predetermined communication method. Note that the predetermined communication method may be, for example, wired communication or wireless communication.

The storage unit 306 includes, for example, a large-capacity storage device such as a hard disk or a solid-state drive in addition to the above-described memory. The storage unit 306 stores, for example, a communication history such as a status (for example, SOC or the like) of the battery 110 of electrified vehicle 100, and stores information (for example, reservation information or the like) received from the store terminal 2a.

The store terminal 2a includes a control unit 2d, a storage unit 2e, and a communication unit 2f. The control unit 2d includes a CPU (not shown) or the like, and is configured to execute a predetermined arithmetic process based on payment information or payment information acquired from the register 2b via the communication unit 2f, information received from the servers 300 via the communication unit 2f, and the like.

The storage unit 2e includes, for example, a storage device similar to the storage unit 306 described above. The storage unit 2e stores, for example, reservation information of the user received from the user terminal 400, information about the usage time of the user in use, information for setting a usage fee, and the like.

The communication unit 2f is configured to be able to communicate with each of the communication unit 304 of the server 300 and the communication unit 404 of the user terminal 400 through the communication network 600. The communication unit 2f and the communication destination device communicate with each other by a predetermined radio communication.

The user terminal 400 includes a control unit 402, a communication unit 404, and a position measurement unit 406. The control unit 402 includes a CPU (not shown) and the like, and is configured to execute a predetermined calculation process based on the position information acquired by the position measurement unit 406, the information received from the servers 300 through the communication unit 404, and the like.

The position measurement unit 406 acquires position information of the user terminal 400. The acquired position information is transmitted to the control unit 402, transmitted to the store terminal 2a through the communication unit 404, or stored in a storage unit (not shown).

The communication unit 404 is configured to be able to communicate with the communication unit 2f of the store terminal 2a through the communication network 600. Information is mutually exchanged with a device of a communication destination with the communication unit 404 by predetermined wireless communication.

In the power management system 1 having the above-described configuration, the vehicle participating in the supply-and-demand adjustment as described above can receive an incentive corresponding to the contribution of the supply-and-demand adjustment.

For example, when electrified vehicle 100 parked in the parking lot 3 is caused to participate in the supply-and-demand adjustment by using the charging and discharging station 200 installed in the store 2, the store 2 may pay an incentive to give the user (occupant) who uses electrified vehicle 100 participating in the supply-and-demand adjustment as described above.

However, the contribution to the supply-and-demand adjustment may be larger than planned even if electrified vehicle 100 participates in the supply-and-demand adjustment in a short period of time, depending on the conditions. Therefore, in a case where the usage fee of the store is calculated in accordance with the usage time, if a large incentive is generated even in the use of a relatively short time, the burden on the store 2 side may become large.

Therefore, in the present embodiment, when electrified vehicle 100 battery 110 and the charging and discharging station 200 are connected to each other and the supply-and-demand adjustment using the battery 110 is performed, the server 300 adjusts the use fee set according to the use period by using the incentive corresponding to the contribution to the supply-and-demand adjustment.

In this way, by adjusting the usage fee set according to the usage time using the incentive, the usage fee can be set so as not to increase the burden on the store 2 side. Therefore, it is possible to appropriately set the incentive for the participants in the supply-demand adjustment.

In the store terminal 2a, the transmission information is transmitted to the user, the reservation of the use of the store 2 is accepted, and the reservation information is transmitted to the servers 300. In the server 300, the supply-demand adjustment is performed using the received reservation information. Further, the store terminal 2a performs a checkout process of setting a usage fee after use of the store 2 by the user and settling the set usage fee.

Figure 2:
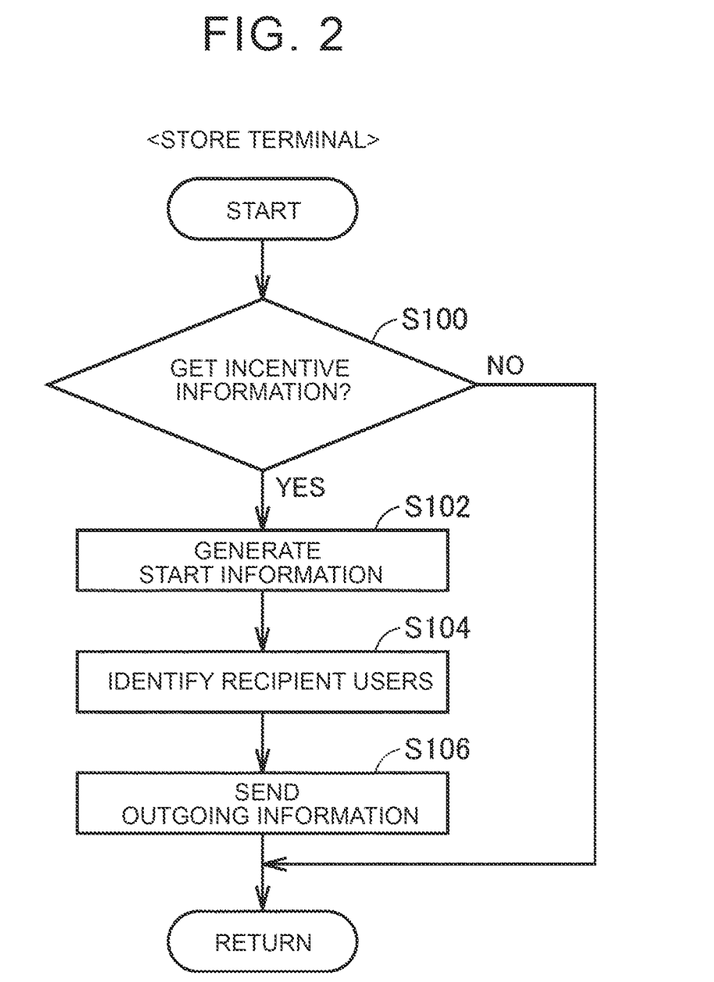
FIG. 2 is a flowchart illustrating an example of a process of transmitting transmission information to a user, which is executed at a store terminal.

Processes executed in each of the store terminal 2a and the servers 300 will be described below. Referring to FIG. 2, an exemplary process of transmitting transmission data to a user, which is executed in the store terminal 2a, will be described. FIG. 2 is a flow chart illustrating an exemplary process of transmitting transmission data to a user, which is executed in the store terminal 2a. The series of processes shown in the flow chart is repeatedly executed by the store terminal 2a at predetermined intervals.

In S100 (the steps are described as S), the store terminal 2a (specifically, the control unit 2d of the store terminal 2a) determines whether or not to acquire the incentive-information for each time-zone from the servers 300. The incentive information for each time zone includes information about the consideration for participating in DR request at each time zone of one day. The time zone includes, for example, a start time and an end time, and is set in advance so as not to overlap with other time zones. The time period may include, for example, a morning time period, a daytime time period, an evening time period, and a night time period, or may include a predetermined time period. The server 300 may transmit the incentive information every time a predetermined time elapses, for example, or the store terminal 2a may request the server 300 to transmit the incentive information every time a predetermined time elapses, for example. If it is determined from the servers 300 that the incentive-information for each time-zone has been acquired (YES in S100), the process proceeds to S102.

In S102, the store terminal 2a generates transmission data. The transmission information to be transmitted to the user of the store 2 is generated. The user of the store 2 includes, for example, a member registered as a user of the store 2 in advance. The store terminal 2a generates transmission information to be transmitted to a transmission destination (for example, the user terminal 400) of a message included as member information. The outgoing information includes, for example, information indicating that a price obtained by the user by participating in DR request in a particular time period is more expensive than other time periods. The price for which the user is obtained may be, for example, a point used for discounting the price of the commodity or service handled in the store 2, a discount rate of the charge of the commodity or service, or a discount amount of the charge of the commodity or service.

In S104, the store terminal 2a identifies the destination user. For example, the store terminal 2a identifies the user of the transmission destination using the past usage record among the plurality of members registered in advance. For example, the store terminal 2a may identify, as the destination user, a user whose cumulative amount of the purchased amount in the store 2 in the latest predetermined period is equal to or larger than the threshold value. Alternatively, the store terminal 2a may identify a user who uses the store 2 (a user who has purchased a product or a user who has received a service) as a destination user within the latest predetermined time. Alternatively, the store terminal 2a may identify all the members as the destination user.

In S106, the store terminal 2a transmits the transmission data to the user terminal of the user who is the destination. The store terminal 2a transmits the generated transmission data to the user terminal of the destination user specified by S104 in S102. If it is determined that the incentive-information is not to be acquired (NO in S100), this process is ended.

Figure 3:
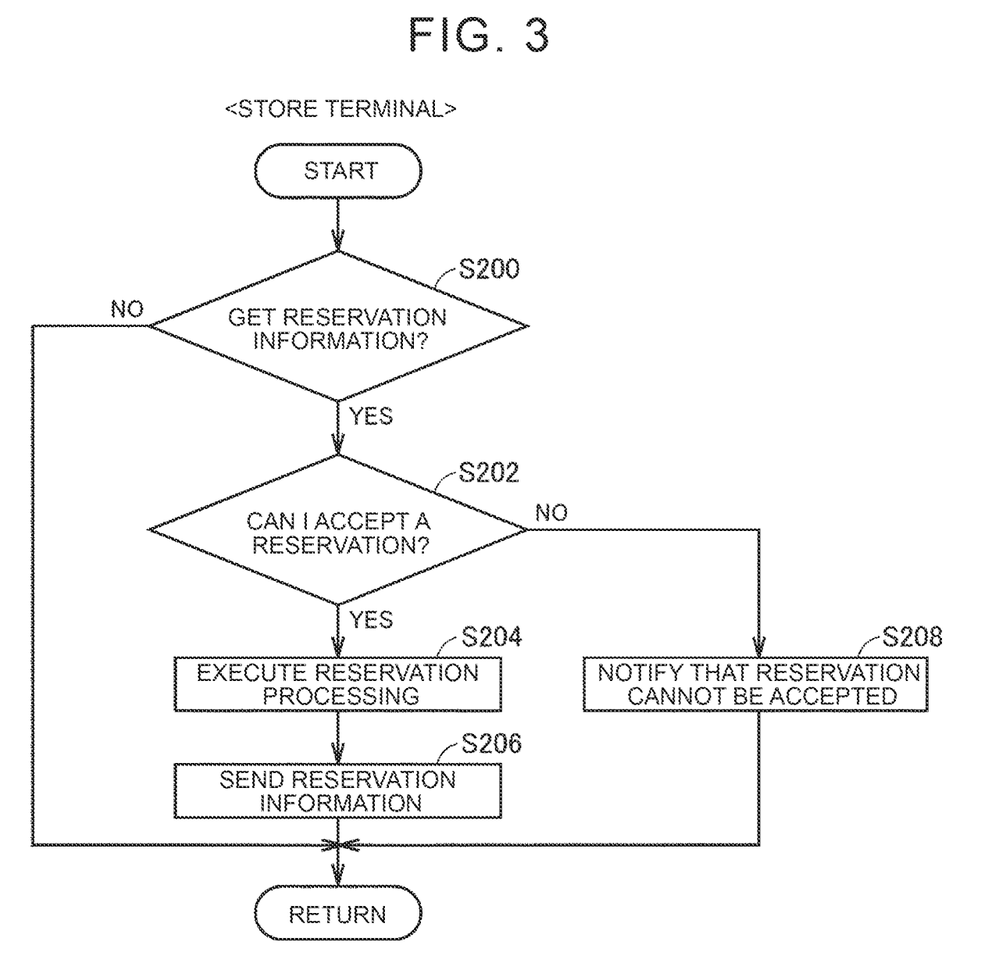
FIG. 3 is a flowchart illustrating an example of a reservation acceptance process executed in the store terminal.

Next, an exemplary reservation acceptance process executed in the store terminal 2a for accepting a reservation will be described referring to FIG. 3. FIG. 3 is a flow chart illustrating an exemplary reservation acceptance process executed in the store terminal 2a. The series of processes shown in the flow chart is repeatedly executed by the store terminal 2a at predetermined intervals.

In S200, the store terminal 2a (specifically, the control unit 2d of the store terminal 2a) determines whether or not to accept the reservation data. For example, when receiving data indicating reservation information from the user terminal 400 through the communication network 600, the store terminal 2a determines to receive the reservation information. The reservation information includes information about a time period in which the store 2 is scheduled to be used, information for identifying the user, and information about whether or not the user wishes to participate in the supply-and-demand adjustment during use of the store 2. The information for identifying the user may include, for example, information about the member number or personal information of the user such as a telephone number. Whether or not there is a desire to participate in the supply-and-demand adjustment while the store 2 is in use is checked by the user as one of confirmation items when other reservation information is input using the user terminal 400, for example. The reserved information may include information about SOC of electrified vehicle 100 battery 110 owned by the user. When it is determined that the reserved data is to be accepted (YES in S200), the process proceeds to S202.

In S202, the store terminal 2a determines whether or not a reservation can be accepted. Specifically, the store terminal 2a determines that the reservation acceptance cannot be performed when the time zone to be the target of the reservation included in the received reservation information overlaps with the time zone that has already been reserved by another user. The store terminal 2a determines that the reservation can be accepted when the time zone to be reserved is a free time zone that is not reserved by another user. If it is determined that reservation acceptance is available (YES in S202), the process proceeds to S204.

In S204, the store terminal 2a executes the reservation process using the reservation data. The store terminal 2a reads out the reservation target time zone and the information specifying the user from the received reservation information, and stores the reservation target time zone (including the information on the start time and the end time) and the information specifying the user in the storage unit 2e in association with each other. The process is then transferred to a S206.

In S206, the store terminal 2a transmits the reservation data to the servers 300. For example, the store terminal 2a may transmit the received reservation information to the server 300 every time the reservation information is received from the user terminal, or may transmit the plurality of reservation information to the server 300 every time a predetermined period elapses or every time a predetermined number of reservation information is received. This process is then terminated. If it is determined that reservation acceptance is not available (NO in S202), the process proceeds to S208.

In S208, the store terminal 2a notifies that the reservation acceptance is not possible. Specifically, the store terminal 2a transmits information indicating that the reservation acceptance is not possible to the user terminal of the destination of the reservation information. This process is then terminated.

Figure 4:
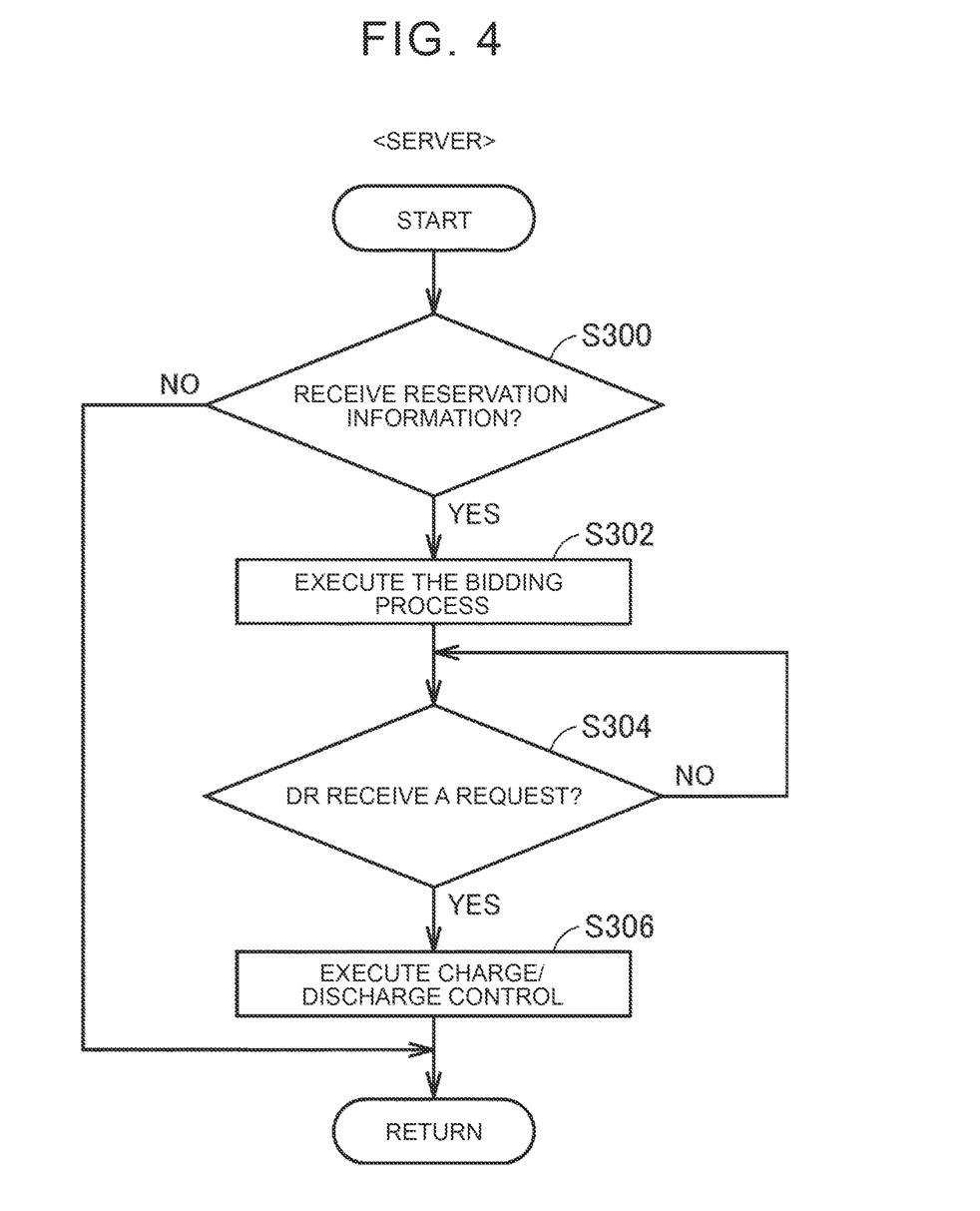
FIG. 4 is a flowchart illustrating an example of a charging and discharging process executed in the server.

Next, an exemplary charging/discharging process for executing charging/discharging control in response to a DR request executed by the servers 300 will be described referring to FIG. 4. FIG. 4 is a flowchart illustrating an example of a charge/discharge process executed in the server 300. The series of processes shown in this flowchart is repeatedly executed by the server 300 at predetermined intervals.

In S300, the server 300 (specifically, the control unit 302 of the server 300) determines whether or not to receive the reservation data. The server 300 determines whether or not to receive the reservation information from the store terminal 2a through the communication network 600. If it is determined that the reservation data is to be received (YES in S300), the process proceeds to S302.

In S302, the servers 300 execute a bidding process. The server 300 uses the received reservation information to set the adjustment force using the small-scale power supply equipment to be controlled. The adjustment force includes a plurality of types of adjustment forces (primary, secondary, or tertiary adjustment forces) that differ depending on responsiveness in addition to the adjustment width of the power. The server 300 bids, as a bid price, a power rate that can be realized by the set adjustment power. The servers 300 are determined as one of DR request destinations when they are awarded as the coordinating power provider.

At S304, the servers 300 determine whether or not to receive DR request. The servers 300 determine that DR request has been received when receiving the data indicating DR request from the higher aggregator through the communication network 600. If it is determined that DR request has been received (YES in S304), the process proceeds to S306.

In S306, the servers 300 execute charge/discharge control. Specifically, the server 300 executes charge/discharge control in each of the plurality of power storage devices included in the small-scale power supply facility by outputting a command to execute charge/discharge control to the small-scale power supply facility to be controlled in accordance with DR request.

The servers 300 implement the tuning force required by DR request in the timezone required by DR request, for example, by sharing the tuning force among some or all of the plurality of small-scale power supply facilities. For example, the servers 300 set a time-zone and a charge/discharge power amount in which charge/discharge control is executed in each of the plurality of small-scale power supply facilities according to DR request. The server 300 outputs a command to execute charge/discharge control to the small-scale power supply equipment to be controlled in accordance with the set time period and charge/discharge power amount.

For example, the server 300 sets a time period in which the charge/discharge control is executed within the scheduled connection period in which electrified vehicle 100 is to be connected to the charging and discharging station 200 using the reservation data. The server 300 sets a time period in which the charge/discharge control is executed at least within the use period of the reserved store 2. The server 300 specifies the use period of the reserved store 2 from the start time and the end time included in the reservation information. Further, the servers 300 set, for example, the amount of electric power (the amount of charge and discharge electric power) to be exchanged with the electric power grid 500 by charge and discharge control based on the usage time of the store 2 and SOC of the battery 110.

The server 300 calculates, for example, a first chargeable power amount calculated from the usage period of the store 2 and the upper limit value of the charging power in the charging and discharging station 200, and a first dischargeable power amount calculated from the usage period of the store 2 and the lower limit value of the discharging power in the charging and discharging station 200. For example, the servers 300 calculate the second chargeable power amount by using the difference between the current SOC of the battery 110 and the upper limit value of SOC, and calculate the second dischargeable power amount by using the difference between the current SOC of the battery 110 and the lower limit value of SOC. For example, the server 300 sets the smaller one of the first chargeable power amount and the second chargeable power amount as the upper limit value of the chargeable power amount, sets the smaller one of the first dischargeable power amount and the second dischargeable power amount as the upper limit value of the dischargeable power amount, and sets the charge/discharge power amount shared by the battery 110.

The server 300 outputs a charge/discharge control execution command to the charging and discharging station 200 at a set time period, and stops the output of the charge/discharge control execution command or outputs a charge/discharge control execution stop command when the set time period elapses. If it is determined that the reserved data is not received (NO in S300), this process is terminated. If it is determined that DR request has not been received (S304: NO), the process returns to S304.

Figure 5:
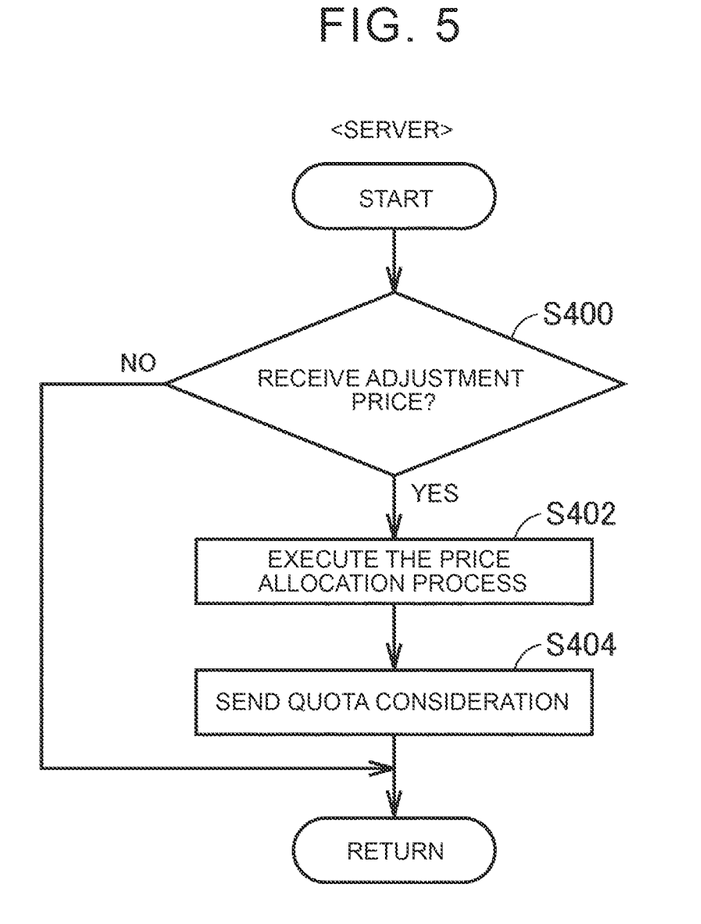
FIG. 5 is a flowchart illustrating an example of an allocation process executed in the server.

Next, an example of an allocation process for allocating the consideration for the adjustment power executed in the server 300 will be described with reference to FIG. 5. FIG. 5 is a flowchart illustrating an example of an allocation process executed in the server 300. The series of processes shown in this flowchart is repeatedly executed by the server 300 at predetermined intervals.

At S400, the servers 300 determine whether to receive the coordinating power consideration. The server 300 determines that the coordination power has been received, for example, when receiving data indicating a price for providing the coordination power to DR request from the upper aggregator. If it is determined that the coordination power consideration has been received (YES at S400), the process is moved to S402.

In S402, the servers 300 execute the price allocation process. Specifically, the servers 300 execute a process of allocating a consideration to each of the plurality of small-scale power supply facilities in accordance with a result of participating in DR request as a consideration allocation process. The consideration may be set, for example, by an amount corresponding to the amount of money, or may be set by a score, a number of points, or the like.

At S404, the servers 300 transmit the assignment consideration. The server 300 transmits, to each of the plurality of power supply facilities having participated in DR request, information indicating the allocation price.

Figure 6:
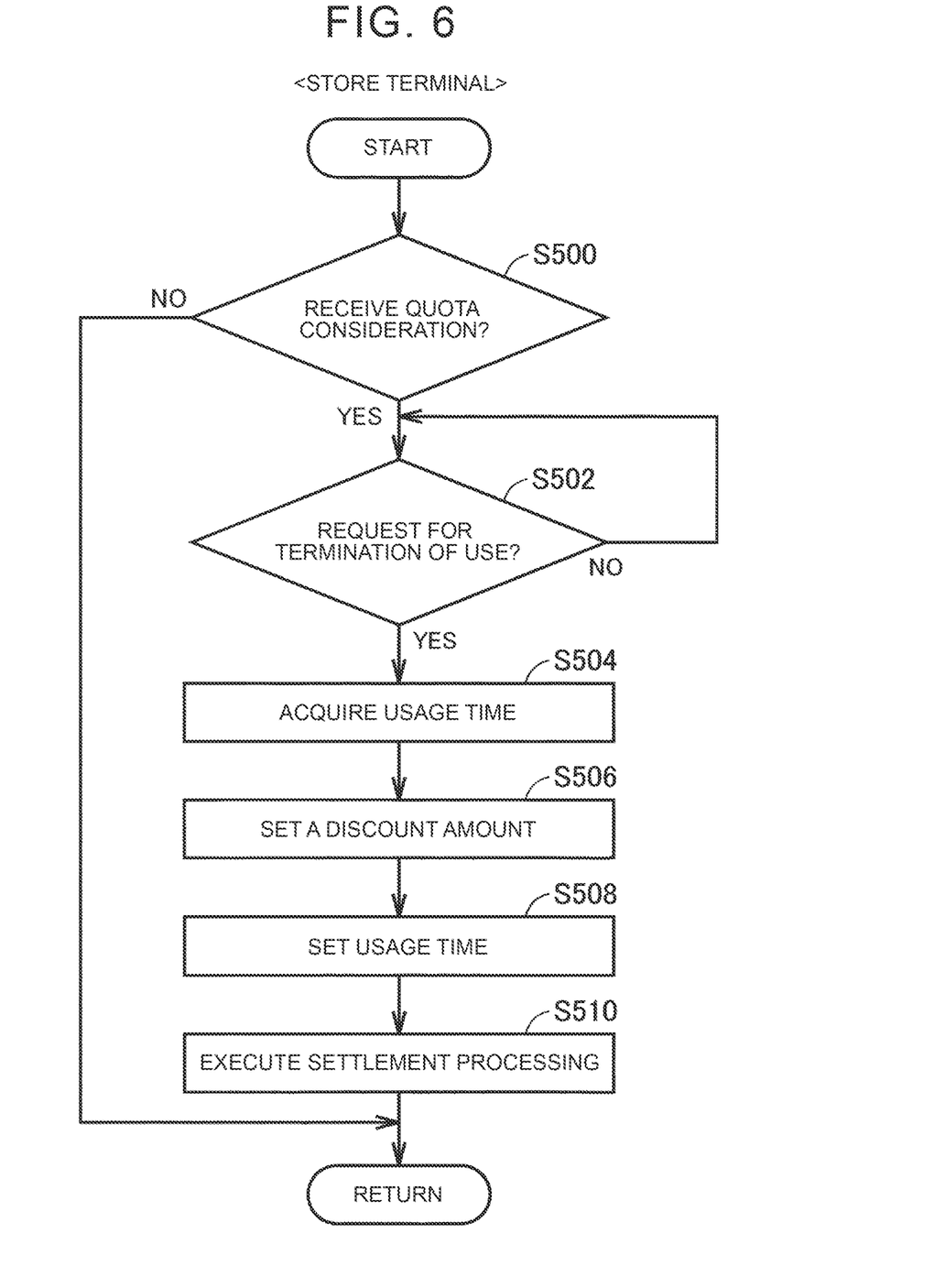
FIG. 6 is a flow chart which shows an example of the adjustment process performed in a store terminal.

Next, referring to FIG. 6, an exemplary checkout process executed by the store terminal 2a and settled after the end of use by the user will be described. FIG. 6 is a flow chart illustrating an exemplary checkout process executed in the store terminal 2a. The series of processes shown in the flow chart is repeatedly executed by the store terminal 2a at predetermined intervals.

In S500, the store terminal 2a determines whether or not an allocation consideration has been received. The store terminal 2a determines that the allocation consideration has been received, for example, when receiving the data indicating the allocation consideration from the servers 300 through the communication network 600. If it is determined that the allocation consideration has been received (YES in S500), the process proceeds to S502.

In S502, the store terminal 2a determines whether or not there is a demand for termination of use. Specifically, for example, the store terminal 2a determines that there is a demand for end of use when an operation of end of use is accepted in an inputting device (not shown) of the store terminal 2a. Alternatively, the store terminal 2a determines that there is a request for termination of use when receiving information indicating a request for termination of use from the user terminal 400 of the user. If it is determined that there is a demand for termination of use (YES in S502), the process proceeds to S504.

In S504, the store terminal 2a acquires usage times. For example, the store terminal 2a acquires the usage time from the usage starting time of the store 2 by the user and the time at which the usage end is requested. For example, the store terminal 2a may acquire, as the use start time, the time at which the user receives the operation at the time of the start of use from the user in the store 2, or may acquire, as the use start time, the time at which the user receives the information indicating the start of use from the user terminal 400 to be reserved.

In S506, the store terminal 2a sets a discount amount. The store terminal 2a sets the discount amount by using the allotment price (corresponding to the incentive for the user). For example, when the usage period is equal to or longer than the threshold value, the store terminal 2a sets an amount equal to the allotment consideration amount as the discount amount. On the other hand, for example, when the usage period is less than the threshold value, the store terminal 2a sets, as the discount amount, an amount obtained by multiplying the allocation consideration by a predetermined factor $\alpha$ (<1). The usage time threshold may be a predetermined value. Further, the threshold value of the usage time is preferably set such that the amount obtained by multiplying the usage time by the usage fee per unit time does not fall below the amount obtained by adding various expenses to the discount amount, for example. The expenses include, for example, a predetermined amount set so that a loss does not occur in the store 2.

In S508, the store terminal 2a sets a usage fee. The store terminal 2a calculates the usage fee by subtracting the discount amount from the amount obtained by multiplying the usage time by the usage fee per unit time, for example.

In S510, the store terminal 2a executes a checkout process. The store terminal 2a executes, for example, a checkout process of checking out a usage fee using the information registered in advance by the user when the user selects an automated payment using the information such as a credit card. Alternatively, the store terminal 2a may execute a checkout process based on receipt of cash, or may execute a checkout process based on another payment process such as cashless settlement. The store terminal 2a may transmit the completion notification of the settlement processing to the user terminal 400 of the user after the completion of the settlement processing, or may transmit the above-described discount amount to the user terminal 400.

Figure 7:
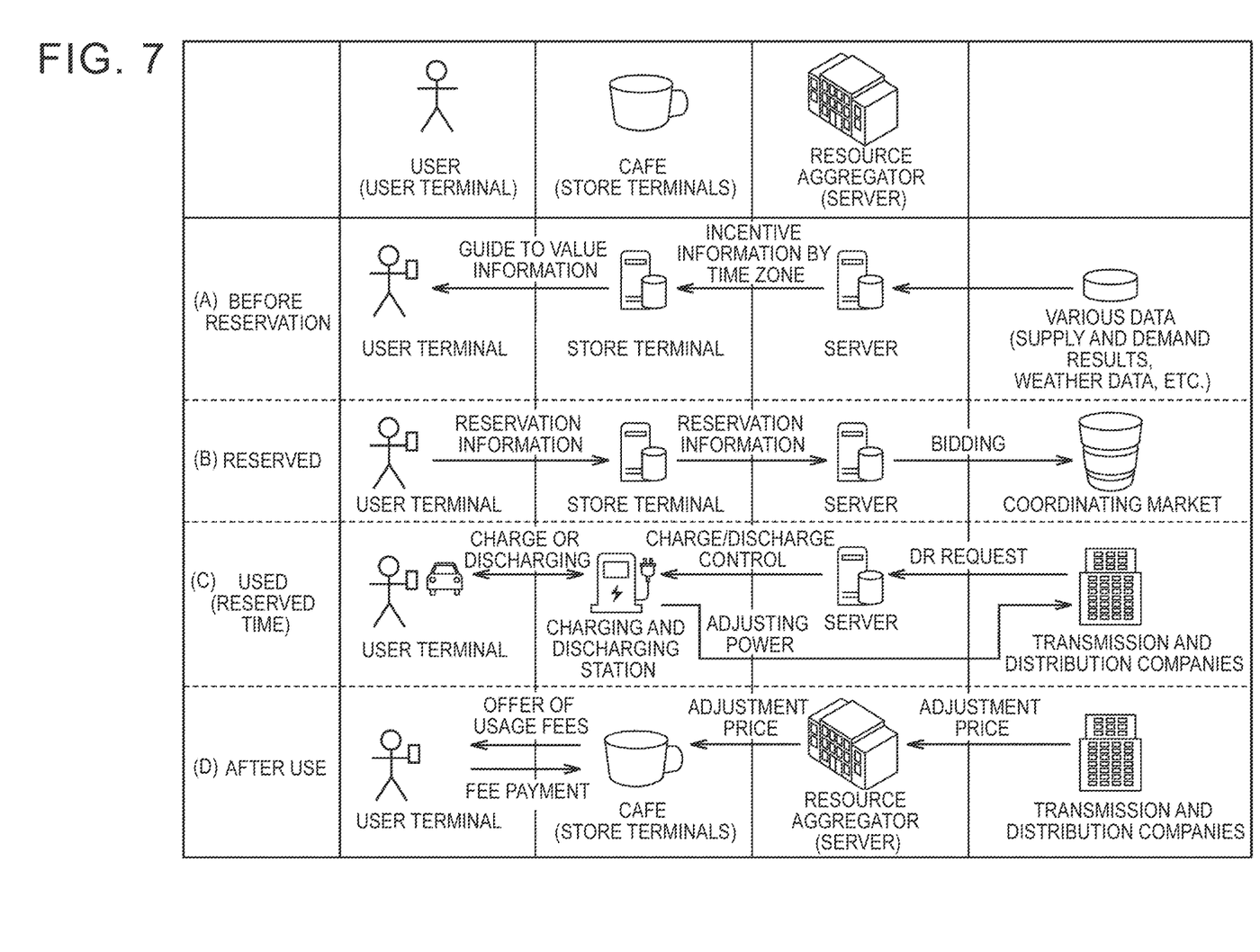
FIG. 7 is a diagram for explaining an example of operations of a user, a store terminal, and a server.

An exemplary operation of the store terminal 2a and the servers 300 based on the above-described configuration and flow chart will be described referring to FIG. 7. FIG. 7 is a diagram for explaining an exemplary operation of the user, the store terminal 2a, and the servers 300. In FIG. 7, a case where the store 2 is a cafe will be described as an example.

(A) Operation Before Reservation

As illustrated in (A) of FIG. 7, for example, the server 300 predicts a change in a demand amount of electric power and a change in a supply amount in one day or a predetermined period using data such as supply-and-demand performance and weather history information accumulated in a predetermined database (not illustrated). The servers 300 set, for example, a time zone in which the demand amount exceeds the supply amount by a predetermined value or more, or a time zone in which the supply amount exceeds the demand amount by a predetermined value or more, as a time zone for DR request target. The servers 300 transmit the information about the time zone of DR request target and the information about the incentive in the time zone to the store terminal 2a as the information about the incentive for each time zone.

When incentive information is acquired in the store terminal 2a (YES in S100), transmission information for the user is generated (S102). At this time, the transmission information of the content promoting the use reservation in the time zone (the time zone of DR request target) in which the incentive is obtained by using the incentive information is generated. The user of the transmission destination is identified (S104), and the transmission information is transmitted to the user terminal 400 of the identified user as "guidance of bargain information" (S106).

(B) About Reservation Operation

As illustrated in (B) of FIG. 7, when the user reserves the use of the cafe, the user terminal 400 transmits reservation information including information about a desired time zone, information specifying the user, and information about whether or not the user desires to participate in the supply-and-demand adjustment during the use of the cafe to the store terminal 2a.

When the reservation data is acquired in the store terminal 2a (YES in S200), it is determined whether or not the reservation can be accepted (S202). For example, when the user included in the reservation information can use a desired time zone, it is determined that the reservation can be accepted (YES in S202), and the reservation process using the reservation information is executed (S204). After the reservation process is executed, the reservation data is transmitted to the servers 300 (S206).

When the user included in the reservation information is unable to use the desired time-zone, information indicating that the reservation is unavailable is notified (S208). Specifically, information indicating that the reservation is not accepted is transmitted to the user terminal 400 of the user included in the reservation information.

In addition, when the server 300 receives the reservation information (YES in S300), the bidding process is executed (S302), and it is determined whether or not DR request is received after the completion of the bidding process (S304). When DR request from the upper aggregator is received (YES in S304), charge/discharge control is executed (S306).

(C) Operation During Use (Reserved Time)

As illustrated in (C) of FIG. 7, it is assumed that the user moves to the store 2, which is a cafe, by using an electrified vehicle 100, and parks electrified vehicle 100 in the parking lot 3 of the store 2. The user moves to the store 2 after connecting the connector 201 to the inlet 62 of electrified vehicle 100. When the connector 201 is connected to the inlet 62 of electrified vehicle 100, the charging and discharging station 200 supplies electric power so that the battery 110 is charged. At this time, the charging and discharging station 200 may calculate an SOC of the electrified vehicle 100 battery 110 or may receive SOC of the battery 110 from electrified vehicle 100.

When the charge/discharge control according to DR request is executed by the execution command from the server 300 during the use of the store 2 by the user (S306), power is supplied from the battery 110 mounted on electrified vehicle 100 to the electric power grid 500, or the battery 110 is charged using the power from the electric power grid 500, so that the difference between the demand amount and the supply amount in the electric power grid 500 is adjusted so as to be small.

(D) Operation After Use

As illustrated in (D) of FIG. 7, after the use of the store 2 by the user, the setting of the usage fee and the settlement of the set usage fee are performed.

From the power transmission and distribution company (or the upper aggregator), the server 300 is notified of the consideration for contributing to DR request. When the adjusting power price is received in the server 300 (YES in S400), a consideration allocation process is executed (S402), and the consideration (allocation consideration) allocated by the consideration allocation process is transmitted to the respective small-scale power supply facilities managed by the server 300 (S404).

In the store terminal 2a, when the allocation consideration is received (YES in S500), it is determined whether or not there is a demand for termination of use (S502). When the user requests to terminate the use (YES in S502), the use period is acquired (S504) and the discount amount is set (S506). At this time, when the use time is equal to or more than the threshold value, the allotment price is set as the discount amount. Further, when the use time is less than the threshold value, the amount obtained by multiplying the discount consideration by a predetermined coefficient α is set as the discount amount. The usage fee is set by subtracting the discount amount set from the amount obtained by multiplying the usage time by the usage time per unit time (S508). Then, the settlement process of the set usage fee is executed (S510).

As described above, according to the power management system of the present embodiment, by adjusting the usage fee set according to the usage time using the incentive, the usage fee can be set so as not to increase the burden on the facility side. For example, when the usage time is shorter than the threshold value, a predetermined coefficient α for correcting the discount amount of the usage fee corresponding to the incentive to be low is set. Accordingly, when the use time is short, the discount amount corresponding to the incentive can be lowered, and thus the use fee can be set so that the burden on the store 2 side is not increased. Therefore, it is possible to provide a power management system that appropriately sets an incentive for a participant in the supply-and-demand adjustment.

Further, since the contribution to the supply-and-demand adjustment is provided to the user of the store 2 as the discount amount, the number of users of the store 2 can be increased.

Further, by promoting the user to use the store 2 in the time period in which the consideration by the supply-and-demand adjustment is obtained by using the transmission information, the user can use the store 2 in the time period, and therefore, the battery 110 on electrified vehicle 100 of the user of the store 2 can be used for the supply-and-demand adjustment.

Hereinafter, modifications will be described.

In the above-described embodiment, electrified vehicle 100 battery 110 connected in the charging and discharging station 200 has been described as calculating SOC, but for example, electrified vehicle 100 may calculate SOC of the battery 110, and the charging and discharging station 200 may acquire information about SOC from electrified vehicle 100, or the reservation information may include information about SOC of the electrified vehicle 100. At this time, the user terminal 400 may acquire, for example, information about SOC of the battery 110 from electrified vehicle 100.

Further, in the above-described embodiment, the store terminal 2a for managing the reservation status of the user and the server 300 for managing the small-scale power supply facility including the charging and discharging station 200 of the store 2 are realized by the individual computers, but the store terminal 2a and the server 300 may be realized by using one computer.

Further, in the above-described embodiment, the case where the user makes a reservation in advance and then uses the store 2 has been described as an example, but the same applies to the case where the store 2 is used without making a reservation. Therefore, the detailed description thereof will not be repeated.

Further, in the above-described embodiment, the server 300 has been described as setting the adjustment force in consideration of the reservation status of the store 2 of the user, but if the store 2 is used by a plurality of users without reservation, the parking lot 3 parked, a plurality of electrified vehicle 100 connected to the charging and discharging station 200 It may be changed at any time (e.g., every predetermined time elapses) schedule for realizing the adjustment force required of the server 300 using.

For example, the servers 300 are parked in the parking lot 3 from, for example, a user's use starting time, and set any electrified vehicle of the plurality of electrified vehicle that is maintained to be connected to the charging and discharging station for a predetermined time or longer as an electrified vehicle for realizing the adjusting force, and output a command for executing the charging/discharging control to the set electrified vehicle. When the connection between electrified vehicle of the output destination of the execution command of the charge/discharge control and the charging and discharging station is released, the server 300 sets any electrified vehicle of the remaining electrified vehicle in which the connection with the charging and discharging station is maintained for a predetermined time or longer as an alternative electrified vehicle, and outputs the execution command of the charge/discharge control to the set electrified vehicle. In this way, it is possible to maintain the coordinating power for DR request even when the user enters and leaves the store 2. Therefore, it is possible to appropriately adjust supply and demand in response to DR request. Note that the servers 300 may set the following alternative electrified vehicle prior to the disconnection of electrified vehicle used to realize the adjusting force from the charging and discharging station. In this way, the supply-demand adjustment can be continued.

Further, in the above-described embodiment, the discount amount is set by multiplying the allotment consideration by a predetermined coefficient $\alpha$ as a correction coefficient for correcting the discount amount when the usage time is less than the threshold value, but the coefficient $\alpha$ is not limited to a predetermined value. For example, the coefficient $\alpha$ may be a value set in proportion to the use time. For example, the coefficient $\alpha$ is set such that the coefficient $\alpha$ becomes smaller as the use time becomes shorter (that is, the discount amount becomes lower). For example, the coefficient $\alpha$ may be set such that the coefficient $\alpha$ becomes larger as the use time becomes longer (that is, the discount amount becomes higher).

Further, in the embodiment described above, the incentive corresponding to the contribution of the user is provided to the user using the discount amount, but the incentive corresponding to the contribution of the user may be provided to the user using cash, a point, or a discount rate.

Further, in the above-described embodiment, the discount amount is set by multiplying the allotment consideration by a predetermined coefficient $\alpha$ when the usage time is shorter than the threshold value, for example, when the usage time is shorter than the threshold value, the discount amount may be set to zero, and a point or cash corresponding to a value obtained by multiplying the allotment consideration by a predetermined coefficient $\alpha$ instead of the discount amount may be given to the user. Alternatively, instead of the discount amount (while the discount amount is set to zero), the parking fee may be reduced or the parking fee may be entirely exempted, or the parking fee may be charged more than when parking (for example, fully charged).

Further, in the above-described embodiment, the discount amount is set by multiplying the allotment consideration by a predetermined coefficient $\alpha$ when the use time is less than the threshold value, but the coefficient $\alpha$ may be changed according to the use time period specified by the use start time and the use end time, for example. For example, the coefficient $\alpha$ in the case where the use time zone is the first time zone in which the number of users is small may be set to be larger than the coefficient $\alpha$ in the case where the use time zone is the second time zone in which the number of users is large.

Further, in the above-described embodiment, a case has been described as an example in which the usage fee is adjusted by multiplying the allocation consideration by a predetermined coefficient $\alpha$ when the usage time is less than the threshold value to correct the discount amount, but for example, when the usage time is longer than the threshold value, the usage fee per unit time may be set to a lower amount than when the usage time is less than the threshold value. In this way, it is possible to promote the use of the store 2 for a long time.

When setting the usage amount, for example, the server 300 may correct the usage fee per unit time to a high amount by multiplying the usage fee per unit time by the correction coefficient $\beta$ (>1) when the usage time is less than the threshold value, and may set the usage fee per unit time when the usage time is equal to or greater than the threshold value to a relatively low amount, or may set the usage fee per unit time to a low amount by multiplying the usage fee per unit time by the correction coefficient $\gamma$ (<1) when the usage time is equal to or greater than the threshold value.

In addition, the above-mentioned modifications may be carried out by appropriately combining all or a part thereof.

The embodiments disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A power management system comprising:
a charging and discharging station that is installed in a store parking space outside of a store and that is connected to a power grid;
a store terminal including a store processor and a memory, wherein the store terminal is configured to be installed in the store;
a user terminal configured to be used by a user;
an aggregator; and
a server including a server processor, wherein the server is configured to communicate with the store terminal and the charging and discharging station, wherein
the server processor is configured to
   receive a demand response request from the aggregator,
   control charge and discharge of a battery of a vehicle connected to the charging and discharging station by control of the charging and discharging station in response to receiving the demand response request,
   receive incentive data from the aggregator, wherein the incentive data includes an incentive corresponding to a contribution amount to the demand response request, and
   transmit the incentive data to the store terminal, and
the store processor is configured to
   receive the incentive data from the server processor,
   acquire from the memory a usage time during which the user uses a service provided to the user inside the store,
   determine whether the usage time is shorter than a threshold time,
   obtain a first value by multiplying a correction coefficient that is less than 1 by the incentive and obtain a second value by multiplying the usage time by a usage fee per unit time of the service provided to the user inside the store, in response to the determination that the usage time is shorter than the threshold time,
   calculate a final usage fee of the service by subtracting the first value from the second value,
   receive a reservation time of the service and a state-of-charge value of the battery of the vehicle from the user terminal,
   determine whether the reservation time is acceptable at the store, and
   transmit the reservation time and the state-of-charge value to the server processor in response to a determination that the reservation time is acceptable at the store, and the server processor is configured to control the charge and discharge of the battery of the vehicle connected to the charging and discharging station based on the reservation time and the state-of-charge time.

2. The power management system according to claim 1, wherein the store terminal is further configured to set the threshold time to a time at which a fee value obtained by multiplying the usage time by the usage fee per unit time is greater than a fee value obtained by adding the first value and a store expense amount.

* * * * *